Figure 1:
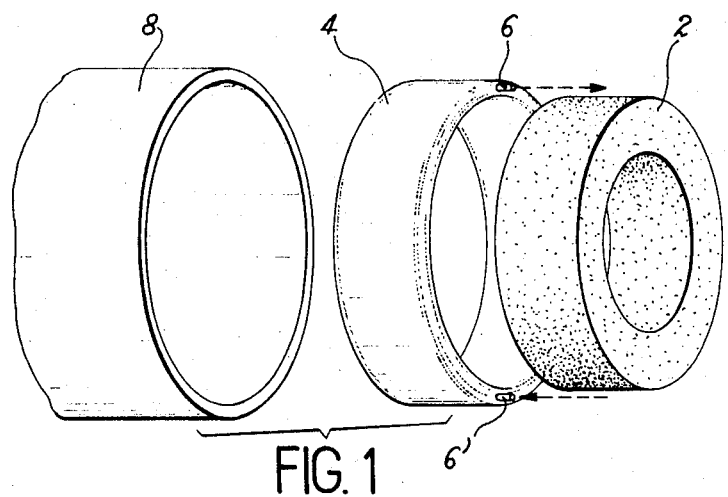

United States Patent [19]

Peuchmaur

[11] 3,847,148
[45] Nov. 12, 1974

[54] DEVICE FOR PROVIDING HEAT INSULATION AT HIGH TEMPERATURES
[75] Inventor: Alfonse Peuchmaur, Boulogne, France
[73] Assignee: Commissariat A L'Energie Atomique, Paris, France
[22] Filed: Sept. 5, 1972
[21] Appl. No.: 286,428

[30] Foreign Application Priority Data
Sept. 9, 1971 France .............................. 71.32546
Dec. 30, 1971 France .............................. 71.47489

[52] U.S. Cl. ............................................... 138/178
[51] Int. Cl. ............................................ F16l 59/12
[58] Field of Search ....... 138/178, 140, 147; 285/97

[56] References Cited
UNITED STATES PATENTS
3,253,854  5/1966  Hollander, Jr. .................... 285/97 X
3,488,040  1/1970  Dickson ........................... 138/155 X Primary Examiner—Jerry W. Myracle
Attorney, Agent, or Firm—Cameron, Kerkam, Sutton, Stowell & Stowell

[57] ABSTRACT

The invention is concerned with heat insulating linings for the ducts of nuclear reactors. A ceramic ring within an elastic sleeve fits within a duct.

10 Claims, 7 Drawing Figures

PATENTED NOV 12 1974 3,847,148

DEVICE FOR PROVIDING HEAT INSULATION AT HIGH TEMPERATURES

The invention relates to a method and device for providing heat insulation at high temperatures.

In the special case of nuclear reactors, fluids at high temperatures flow in a number of ducts connecting various parts of the reactor, e.g., in the ducts connecting the reactor core to the exchangers. The ducts must therefore be lined with a very efficient heat insulator in order to avoid excessive heat losses. The tubes also are subjected to steep temperature gradients and expand and are subject to frequent deformation; furthermore, the fluid inside the tube is at a high temperature and usually flows at a considerable speed. Consequently, the heat insulator lining the inner wall of the duct must have high mechanical strength and must be assembled so as to prevent any vibrations. Advantageously also, the heat insulator must be easily demountable from the duct, so that elements of the heat insulator can be replaced if required.

Silicon fibres are frequently used as an insulator but have very low mechanical strength. A complex protective system is required when they are assembled, and they have very poor sealing-tightness.

The invention aims to provide a method and device for heat insulation at high temperature such as to avoid the disadvantages of the prior art devices.

The method is essentially characterised in that a ring of ceramic material having a low coefficient of thermal expansion, a high elastic limit on compression and a low coefficient of thermal conductivity is disposed with clearance against the inner wall of a hollow-walled sleeve of deformable material, the sleeve is introduced into the tubular duct, the dimensions of the sleeve being such that it fits with clearance into the duct, and a fluid is injected under pressure into the wall of the sleeve, the pressure of the fluid being such that it deforms the sleeve so that the ceramic ring is prestressed by the wall of the duct to be heat-insulated.

According to another feature of the method according to the invention, the injected fluid is a gas or a liquid which does not change state at the operating temperature of the duct.

According to a first alternative embodiment, the fluid after injection is imprisoned in the cavity in the sleeve, thus maintaining the prestress on the ceramic ring.

According to another variant embodiment, the fluid is injected at a pressure such that the sleeve undergoes plastic deformation, the deformation being such as to prestress the ceramic ring after the fluid has been evacuated and the cavity of the sleeve is connected to the interior of the duct.

According to a third embodiment, the fluid injected into the wall of the sleeve has the property of resolidifying at the operating temperature of the duct.

In the method, therefore, there are three alternatives relating to the method of deforming the hollow sleeve:

a) the fluid is injected and then evacuated from the wall,
b) the fluid is injected into the wall and imprisoned there, or
c) the fluid is injected into the wall of the sleeve and imprisoned there, becoming solid after injection.

The heat-insulating device is characterised in that it comprises at least one annular element, each of the aforementioned annular elements comprising a hollow-walled, deformable sleeve, and a cylindrical ceramic ring pressed against the inner surface of the sleeve, which is adapted to receive a fluid injected under pressure into its hollow wall.

The sleeve, therefore, pre-stresses the ceramic ring, thus ensuring sealing-tightness between the refractory element and the duct and thus also compensating the pressure exerted on the ceramic ring by the fluid flowing inside the duct. In the first embodiment, prestressing is provided by the sleeve by means of the pressure of the fluid filling the cavity in the sleeve. In the second embodiment, the pressure of the fluid on injection is such that it produces plastic and consequently permanent deformation of the sleeve, thus simultaneously pre-stressing the ceramic ring. More particularly, the aforementioned heat-insulating system is advantageously applied to the case where the inner wall of the tube is rough, i.e., is not machined.

According to a first embodiment of the device, the hollow sleeve comprises a continuous ring. According to another embodiment, the sleeve comprises an assembly of segments bounded by diametral half-planes. In a third embodiment, the ceramic ring can be continuous or made up of juxtaposed elements.

Figure 2:
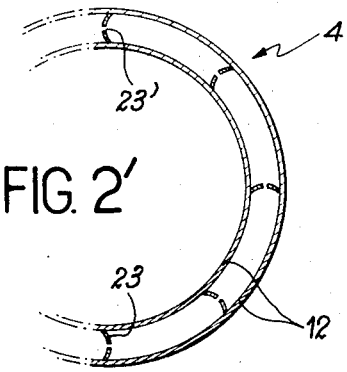
Figure 1:
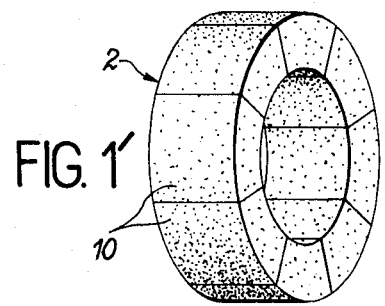
Figure 3:
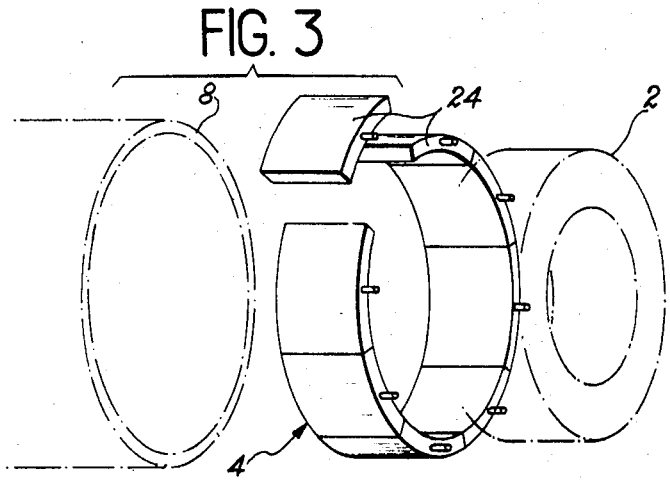
Figure 2:
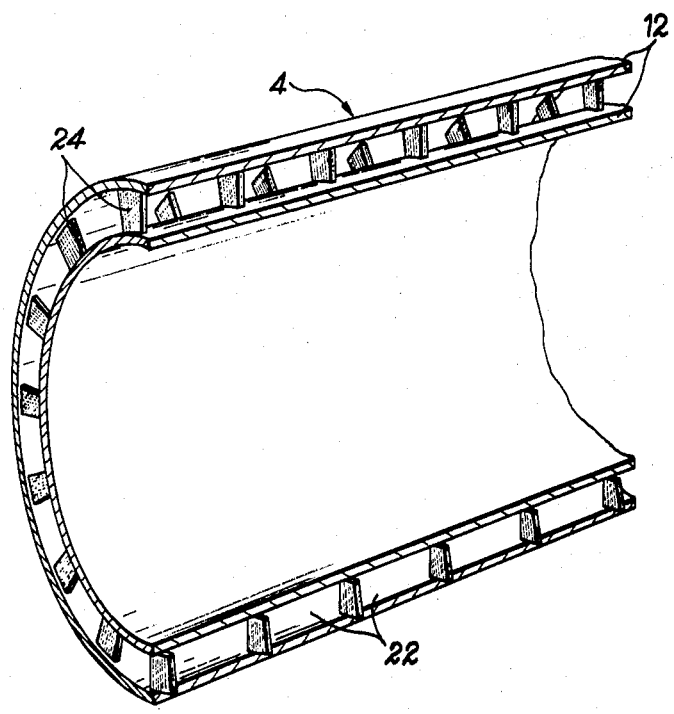
Figure 4:
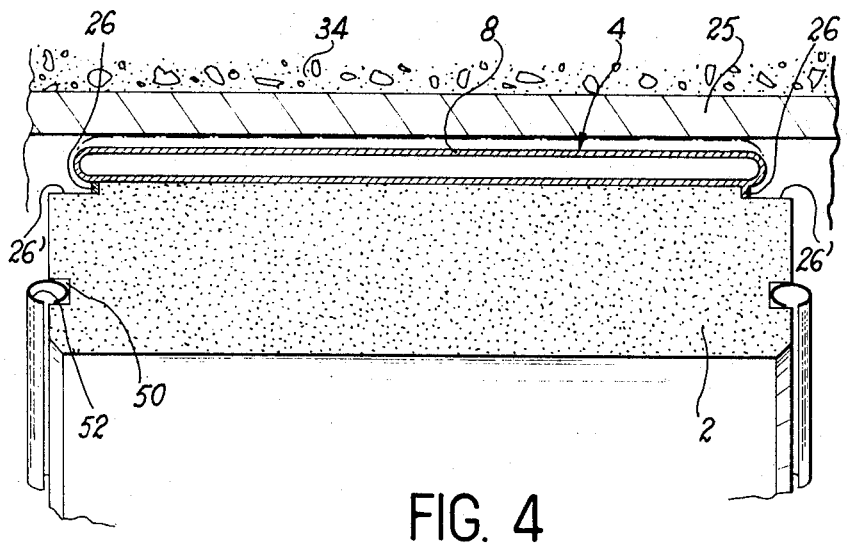
Figure 5:
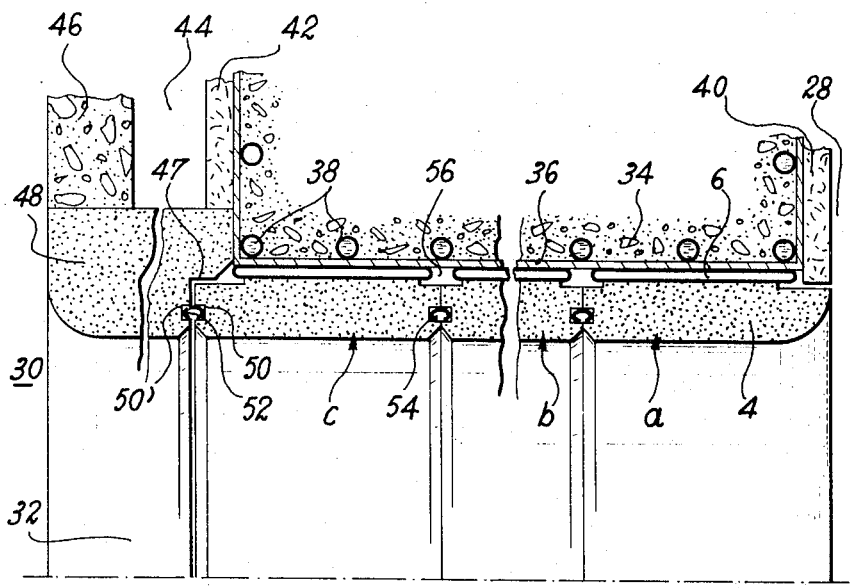

The invention will be more clearly understood from the following description of an exemplary nonlimitative embodiment of the invention. The description refers to the accompanying drawings in which:

FIG. 1 is a perspective view of the various elements of the device before assembly, the ceramic ring being continuous, FIG. 1' is similar except that the ring is made of a plurality of elements, FIG. 2 is a perspective view in section of a hollow-walled sleeve having discontinuous internal partitions, FIG. 2' is a half-view in section of another embodiment of a hollow-walled sleeve, FIG. 3 shows a hollow-walled sleeve made up of a number of separate elements, and FIGS. 4 and 5 are examples of the assembly and use of the device according to the invention.

FIG. 1 shows how the method according to the invention is embodied. A ceramic ring is introduced into a hollow-walled sleeve 4 having at least two orifices 6 and 6', and the resulting assembly is inserted with clearance into a duct 8 to be heat-insulated. A pressure fluid for pre-stressing the ceramic ring 2 is injected through one of the orifices 6, 6', the other orifice 6 or 6' being used for evacuating the air from sleeve 4 during a preliminary operation. When all the air has been evacuated, one of the orifices 6, 6' is closed and the fluid is injected through the other orifice until the required pressure is reached. Thereupon, the second orifice is of course closed.

In the case when the duct to be heat-insulated is horizontal, a fluid solidifying at the operating temperature of the duct may be injected into the bottom part of the sleeve, before the pressure fluid is injected. When the fluid solidifies, it produces at least one partition at the bottom of the sleeve. The partition, which connects the two walls of the sleeve, strengthens that part of the hollow sleeve which bears the weight of the ceramic ring.

According to the second embodiment of the method, the fluid under pressure is injected in the same manner. As soon as the required plastic deformation has been obtained, the interior of the hollow-walled sleeve 4 is connected to the duct to be heat-insulated. To this end, additional orifices plugged by weld spots during the filling operation are provided on the side wall of sleeve 4, i.e., on the wall already provided with orifices 6 and 6'. After plastic deformation has been produced, the weld spots are eliminated so as to connect the interior of the hollow sleeve to the duct, or orifices can be formed in the lateral surface of sleeve 4.

The fluid used to compresss the sleeve can be a gas or a liquid. The liquid may advantageously be water. In some cases, however, no traces of water must be left in the ducts, in which case the substance injected may be a gas such as air, carbon dioxide or helium.

In the third embodiment, in which the injected fluid solidifies, the fluid may be a mortar which shrinks very slightly, an alloy melting at low temperatures or plastics having a high melting point.

The first embodiment, apart from being easy, has the advantage of being insensitive to the expansion under pressure or temperature of the duct to be heat-insulated. This is because, when the diameter of the duct increases slightly with temperature, the pressure of the fluid in the sleeve simultaneously increases and deforms the sleeve so as to compensate the expansion of the duct.

In order to use the second embodiment, the expansion of the duct to be heat-insulated must be equal to or less than the expansion of the ceramic ring. This is because, since the cavity of the sleeve is connected to the duct, an increase in temperature increases the duct diameter and does not increase the pressure in the sleeve. Consequently there is no compensation.

Furthermore, after the injection fluid has been eliminated, the sleeve undergoes slight elastic shrinkage which may be unacceptable if the expansion of the ceramic ring is not greater than the expansion of the duct during operation. In this respect sleeves made up of a number of segments (to be described hereinafter) are markedly superior to continuous sleeves, since the shrinkage is relative to the thickness of the sleeve (of the order of 20 mm) instead of being relative to the radius of the sleeve (of the order of 600 mm).

In the embodiment shown in FIG. 1', the cylindrical ceramic ring may be made up of a plurality of juxtaposed elements 10. This embodiment has the advantage of facilitating the insertion of ring 2 into sleeve 4 but has the disadvantage that the duct is less sealing-tight.

FIG. 2 shows a particular embodiment of the hollow-walled sleeve 4. Discontinuous radial partitions comprising metal plates such as 24 are disposed inside cavity 22 of sleeve 4. The partitions cooperate with the side walls to absorb axial and radial forces due to the flow of heat-insulating gas and the weight of the ceramic. The walls are slightly inclined or curved to facilitate the expansion of sleeve 4 under the injection pressure, but are sufficiently rigid to withstand the aforementioned forces.

In one embodiment (not shown) continuous radial partitions disposed in radial planes bound a number of sealing-tight compartments inside the cavity 22 of sleeve 4. Of course at least one fluid injection orifice is required for each sealing-tight compartment. In the case where the duct is horizontal, the last-mentioned embodiment can be used to ensure that the pressure in the sealing-tight compartments at the bottom of sleeve 4 is slightly greater than the pressure of the other sealing-tight compartments, in order to compensate the weight of the ceramic ring 2.

According to another embodiment, shown in FIG. 2', the hollow-walled sleeve 4 has continuous radial partitions such as 23, provided with small calibrated orifices such as 23'. The last-mentioned embodiment is particularly useful if the injected fluid is a liquid. In this case, the pressure in the chambers varies whenever walls 12 of sleeve 4 are subjected to vibration, with the result that fluid is displaced from one chamber to another via orifices 23'. If the orifices 23' are suitably calibrated, the resulting pressure drop provides a shock-absorbing end point for the entire fluid, and thus limits vibration.

According to another embodiment, shown in FIG. 4, the hollow-walled sleeve 4 is made up of a plurality of juxtaposed hollow-walled segments 24. Each segment 24 comprises a portion of sleeve 4 bounded by two diametral half-planes. Of course, each segment 24 has at least one orifice for injecting fluid. This embodiment, like the previous one, can be used to introduce a fluid at a slightly higher pressure into the segments 24 forming the bottom of sleeve 4, in order to centre the ceramic ring 2.

Of course, the device shown in FIG. 1 is preferably used for that embodiment of the method in which the fluid solidifies after injection, since in this case the assembly is strengthened by the solid remaining in the wall of the sleeve.

If the eccentricity of duct 8 is excessive, air cushions can be introduced between the inner wall of duct 8 and the outer wall of sleeve 4 in order accurately to centre the ceramic ring.

In the case of a segmented ring, axial sealing-tightness can be provided by sealing the interstices between the segments with a suitable material.

A substance such as rubber or plastics can be attached between the metal wall of sleeve 4 and the outer duct 8. The resilience or adhesion of the rubber or similar product improves the mechanical properties and provides axial sealing-tightness.

In one method of assembling the device in a duct 25 shown in FIG. 4, the inner surface of sleeve 4 can have lugs 26 which engage in grooves 26' provided on the lateral surface of each ceramic element 2, so as to secure the elements with respect to sleeve 4. Of course, one of the lugs 26 is welded after elements 2 have been introduced into sleeve 4.

FIG. 5 is an example showing how the heat insulator according to the invention is applied to one of the ducts connecting the exchangers to the structure supporting the reactor core. The well of exchanger 28 is connected to the bottom of the support structure 30 by a duct 32 which is to be heat-insulated. The prestressed concrete vessel 34 is lined by a metal coating 36 called a "steel liner". In the example under consideration, the metal coating is maintained at a temperature of approximately 60°C by water pipes 38.

On the side of exchanger 28, the metal wall 36 is protected by a conventional heat insulator 40. On the side of the reactor core 30, a conventional heat insulator 42 lines the metal wall 36, which protects an annular cavity 44 surrounding the structures 30 supporting the reactor core, which in turn are underneath a graphite-steel wall 46.

Cavity 44 is filled with a cold coolant (at approximately 300°C) at a slightly higher pressure than the coolant leaving the reactor channels, which is hotter than 750°C. The bottom of cavity 44 is bounded by a block 48 of refractory ceramic.

A number of heat-insulating devices *a*, *b*, *c* according to the invention are disposed inside tube 32. In the sectional plane, eahc heat-insulating element comprises a refractory element 2 and a corresponding sleeve 4. Each heat-insulating device is closely juxtaposed with the neighbouring devices, thus providing good sealing-tightness. The last device *c* fits into a shoulder 47 of the refractory block 48. In order to improve the sealing-tightness between the last-mentioned two devices, an O-ring 52 is disposed inside grooves 50, 50' formed in each of the devices.

In order to facilitate the insertion of the tube heat insulator into the reactor, only one groove may be formed in the heat-insulating element *c* in order to introduce the O-ring 52. Next, the "open" side of the O-ring is turned towards the place where the pressure is higher, i.e., in the present case towards the exterior of the tube. In order to improve the sealing-tightness between two consecutive heat-insulating devices, a seal such as 54 on the drawing can be introduced, seal 54 being identical with the seal used between block *c* and block 48. Any suitable material can be used to plug interstices such as 56 between pairs of consecutive sleeves (the interstices are necessary owing to the presence of orifices for filling the sleeves).

By way of example, the following pressures for the various elements of a heat-insulating device were obtained, using a continuous deformable sleeve and a ceramic (Mas rock) ring having an outer radius 2.6 times its thickness, in the case of a duct wherein a fluid at 500°C flowed at a pressure of 54 kg/cm²:

| | |
|---|---|
| Pressure in sleeve: | 80 kg/cm² |
| Differential pressure of sleeve: | 26 kg/cm² |
| Stresses due to the differential pressure: | Approx. 70 kg/cm² |
| Stresses due to thermal gradient of ring: | Approx. ± 70 kg/cm² |
| Actual stress on exterior of ring: | Approx. 0 |
| Actual stress on interior of ring: | Approx. 140 kg/cm² |

Of course the invention is not limited to the examples described and shown in detail, but includes all alternative embodiments. More particularly, ring 2 can be made from any material meeting the required conditions. For example silica-based ceramics meet the conditions satisfactorily.

I claim:

1. A heat-insulating device for a tubular duct comprising at least one annular element, each of said annular elements including therein a hollow-walled, deformable sleeve, and a cylindrical ring of ceramic material having a low coefficient of thermal expansion, a high elastic limit of compression and a low coefficient of thermal conductivity pressed against the inner surface of the sleeve and means for injecting a fluid under pressure into said sleeve to prestress said ring.

2. A device according to claim 1, said cylindrical ring being in one piece.

3. A device according to claim 1, said cylindrical ring comprising a number of juxtaposed ceramic elements, each element having the shape of a portion of a cylindrical ring bounded by two diametral half-planes.

4. A device according to claim 1, said sleeve being continuous.

5. A device according to claim 1 said sleeve including juxtaposed hollow-walled segments, each of said segments occupying the volume of a ring portion bounded by two diametral half-planes.

6. A device according to claim 1 including a fluid, said fluid injected into said sleeve being selected from the group consisting of mortars which shrink very slightly, alloys melting at low temperatures, and plastics having a high melting point.

7. A heat-insulating device for a tubular duct comprising at least one annular element, each of said annular elements including therein a hollow-walled, deformable sleeve, and a cylindrical ring of ceramic material having a low coefficient of thermal expansion, a high elastic limit of compression and a low coefficient of thermal conductivity pressed against the inner surface of the sleeve and means for injecting a fluid under pressure into said sleeve to prestress said ring, the fluid injected under pressure being a liquid and said hollow-walled sleeve being continuous and internal radial partitions provided with calibrated orifices in said sleeve.

8. A device according to claim 7, the radial partitions being continuous and disposed on axial planes forming sealing-tight compartments inside said sleeve.

9. A device according to claim 7 said radial partitions being discontinuous and disposed along diametral planes of the sleeve.

10. A heat-insulating device for a tubular duct comprising at least one annular element, each of said annular elements including therein a hollow-walled, deformable sleeve, and a cylindrical ring of ceramic material having a low coefficient of thermal expansion, a high elastic limit of compression and a low coefficient of thermal conductivity pressed against the inner surface of the sleeve and means for injecting a fluid under pressure into said sleeve to prestress said ring, said ceramic rings having facing annular grooves and an annular seal in said grooves.

* * * * *